Dec. 11, 1923.
C. W. HOUGH
MILES PER GALLON REGISTER
Filed Sept. 20, 1921   2 Sheets-Sheet 1
1,477,489
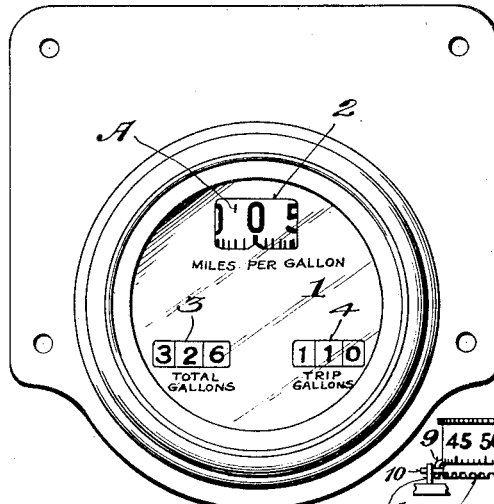
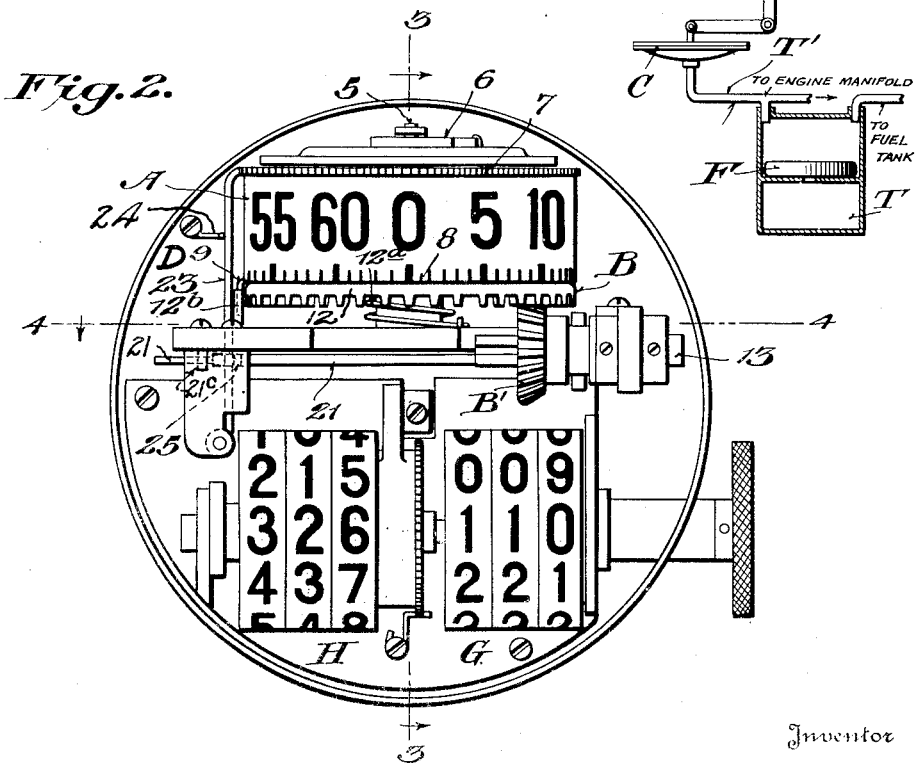
Inventor
C. W. Hough,
WITNESSES:—
By
Attorney Dec. 11, 1923.
C. W. HOUGH
MILES PER GALLON REGISTER
Filed Sept. 20, 1921      2 Sheets-Sheet 2
1,477,489
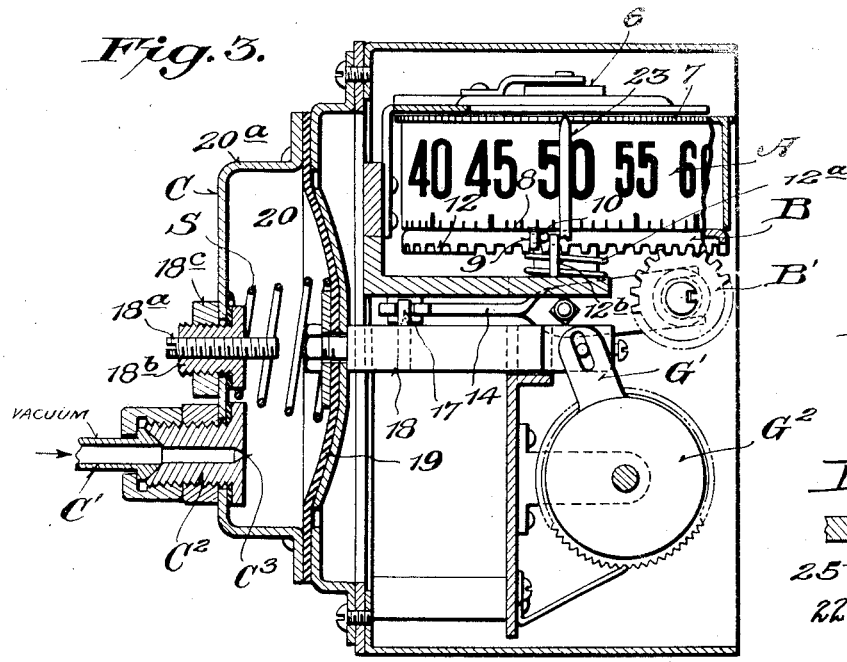
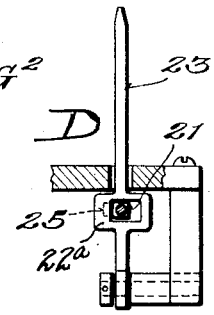
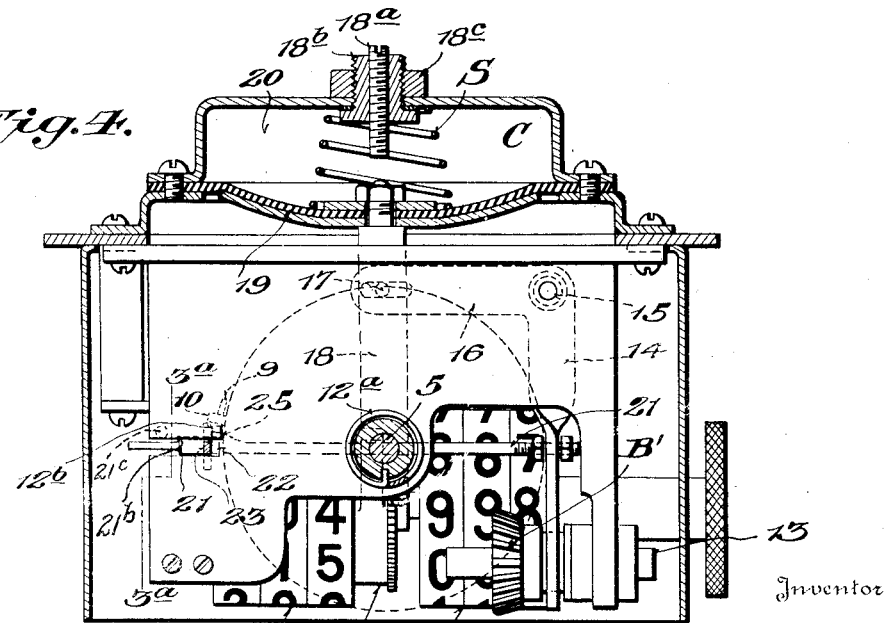
Inventor
C. W. Hough,
WITNESSES:
By
Attorney Patented Dec. 11, 1923.

1,477,489

UNITED STATES PATENT OFFICE.

CLINTON WALLACE HOUGH, OF BOONVILLE, NEW YORK.

MILES-PER-GALLON REGISTER.

Application filed September 20, 1921. Serial No. 501,931.

*To all whom it may concern:*

Be it known that I, CLINTON W. HOUGH, a citizen of the United States, residing at Boonville, in the county of Oneida and State of New York, have invented certain new and useful Improvements in Miles-Per-Gallon Registers, of which the following is a specification.

This invention relates to an improved device for indicating the distance traveled per unit of fuel consumed by an automobile, or other vehicle.

To that end the invention contemplates a simple, practical, and reliable device adapted to be positioned on the dash or instrument board of an automobile for indicating the distance covered in relation to the consumption of measured unit quantities of fuel, or in other words visually indicating the miles traveled by the vehicle, per gallon of fuel. Obviously, it is of a decided advantage to know at all times the relation of fuel consumption in proportion to the distance traveled to determine the efficiency of the motor under different loads and operating conditions, and to that end the present invention has in view a device which will reliably function to give the desired indication.

A further object of the invention is to provide a construction, which in addition to indicating the miles per gallon will also register the number of gallons consumed per trip, as well as the total gallons consumed for the season.

Another object of the invention is to provide a construction which may be readily standardized thereby effecting material economies in production, while at the same time maintaining a standard of construction that insures reliability and service.

With the above and other objects in view it will more readily appear as the nature of the invention is better understood, the same consists in the novel construction, combination, and arrangement of parts, hereinafter more fully described, illustrated and claimed.

A further and more practical embodiment of the invention is shown in the accompanying drawings in which Figure 1 is a front elevation of a complete device.

Figure 2 is a front elevation of the device with the face plate removed.

Figure 3 is a vertical sectional view taken on the line 3—3 of Figure 2.

Figure 3ª is a detail elevation of the pawl for engaging and releasing the dial.

Figure 4 is a horizontal sectional view taken on the line 4—4 of Figure 2.

Figure 5 is a diagrammatic view illustrating the general operation of the device.

Similar reference characters designate corresponding parts throughout the several figures of the drawings.

In carrying the present invention into effect it is proposed to utilize a suitable dial or indicator that may be actuated or moved variable distances in accordance with the proportion of fuel consumption to distance traveled, and, to that end a relatively floating dial or other indicating element A may be employed, the same being responsive to controlling elements B and C respectively connected with a road wheel of the vehicle and the vacuum system which supplies fuel to the carburetor.

Therefore, in its primary aspect, the invention preferably includes in its organization a miles per gallon indicating dial A, an odometer element B and a vacuum actuated diaphragm unit C the latter being directly connected by line C' with the vacuum chamber of the vacuum tank for the fuel supply system, such for example as the well known Stewart vacuum system. Briefly this system includes a relatively small tank T, usually positioned under the hood of the vehicle and having a connection T' with the intake manifold of the engine thereby to create a vacuum in the upper part of the tank to draw fuel from the supply tank ordinarily carried at the rear of the chassis.

As the gasoline fills the upper vacuum chamber of the tank T, the float F rises, and when it reaches a certain height it automatically shuts off the vacuum valve and permits the gasoline to flow from the upper chamber of the tank to the lower chamber for use in the carburetor. A standard unit or known quantity of fuel is pumped by each operation of the vacuum tank system.

Referring now to the general operation of the device it is pointed out that the dial A having thereon a miles per gallon scale is advanced to a certain point by the actuation of the odometer element B due to the fact that the driving pinion B' is driven by the road wheel of the vehicle, and the said dial A is temporarily held at the maximum advanced limit by a check device D. The indication thus given by the dial A will show the miles per gallon obtained from the unit of fuel last used by the motor. When said unit of fuel is exhausted, the vacuum system will cause another unit quantity of fuel to be drawn from the main supply tank, by creating a vacuum in the upper chamber of the auxiliary tank T. This vacuum results in the diaphragm unit C of the present device being actuated since, as shown in the diagram Figure 5, it is connected to the vacuum chamber of the auxiliary tank.

Upon the operation of the diaphragm unit C, the sequence of operation is as follows: First, check device D, pawl 23, is operated to temporarily release dial A; second, dial A under influence of spring 6 is turned backwards until its stop 9 engages with abutment 10 on odometer element B. It is to be understood that dial A does not turn back unless the current odometer reading is less than the previous one; third, pawl 23 re-engages the rack 7 of the dial A; fourth, pinion B' disengages from rack 7 and the odometer wheel B is returned to zero position by spring $12^a$. In case the distance traveled by the vehicle during the consumption of the next unit of fuel exceeds that of the previous case, odometer element B will reach and pass its previous advanced position with the result that abutment 10 of the element B will engage stop 9 on dial A and positively advance it to its new position; pawl 23 holding A in its most advanced position until released by an operation of the diaphragm unit C. These operations are repeated for each unit of fuel consumed, so that at frequent intervals new indications will be given showing the miles per gallon consumed according to the changed conditions of running, as for example on the level, or up and down grade, or in high, low or intermediate gear.

While the elements for accomplishing the foregoing purpose are susceptible of embodiment in various structural forms, a simple and convenient embodiment is shown in the accompanying drawings from which it will be observed that the instrument includes a face plate 1 having an opening 2 for exposing the dial A and other windows 3 and 4 respectively for permitting the reading of the total gallons and gallons per trip registers.

The indicating dial A having the desired calibrations thereon is rotatably mounted on the post 5, and a suitable coil spring 6 may be used for returning the same to zero. The upper edge of the dial ring is provided with a milled flange or toothed ring 7 while the lower edge of skirt portion 8 has a depending stop arm 9 adapted to engage an abutment 10 carried by the odometer element B.

The said odometer element is preferably in the form of a plate having a downturned edge formed with a rack portion 12 adapted to be engaged by the teeth of the driving pinion B'. To prevent damage to the instrument when the vehicle coasts on long stretches without consumption of fuel, teeth are removed to prevent the rack from making more than one revolution. As will be seen from the drawings the said driving pinion B' is slidably keyed to a main driving shaft 13 geared with one of the road wheels of the vehicle and is shiftable thereon through the medium of a shifter lever 14 which is pivoted as at 15 and has its arm 16 adapted to be engaged by an abutment 17 on the diaphragm actuated plunger-stem 18 of the vacuum controlled diaphragm unit C.

The plunger-stem 18 above referred to is suitably fastened to a diaphragm 19 that is normally under the tension of a spring S so that upon the creation of a vacuum in the chamber 20 of the unit C the diaphragm will be pulled against the tension of said spring and thus move the stem 18 to cause the angular lever 14 to be shifted. The odometer element B having thereon the rack 12 is adapted to be returned to its normal zero position by means of a spring $12^a$, acting similarly to the spring 6. It will of course be understood that the odometer wheel B engages with a stop $12^b$, for example, on the frame of the device so that the influence of the spring $12^a$ will be checked when the odometer wheel is returned to its initial or zero position.

In connection with the operation of the plunger stem 18, it will be noted that its backward limit of travel or backward throw under the influence of the vacuum created in the chamber 20, may be limited by the adjustable stop $18^a$. This stop may be a machine screw or the like fitted in a suitable bushing $18^b$ and held in the casing $20^a$ of the vacuum chamber by a suitable nut $18^c$. The construction described and the general arrangement of the vacuum responsive unit C is clearly shown in Figures 3 and 4 of the drawings, and as will also be observed from the former figure, the line or connection C' with the vacuum system is provided with a suitable union joint, for connecting the line C' with the casing of the vacuum unit. This union is such as to provide for the actuation of the plunger-stem 18 without shock or jar and to that end preferably includes a bushing $C^2$ having a relatively small orifice or outlet $C^3$ communicating with the interior of the chamber 20.

For the purpose of operating the check device D, to alternately hold and release the dial A at proper intervals, the angular lever 14 has connected thereto an arm 21 having a shoulder 22 for engaging the yoke portion $22^a$ (Figure $3^a$) of a pawl 23. The said arm 21 is suitably guided in the frame and readily moves when the lever 14 is shifted to cause the pawl 23 to disengage with the teeth on the upper edge of the dial member A. A spring 24, or its equivalent, normally causes the pawl 23 to engage the dial A to releasably hold it to give the desired indications.

The plunger-stem 18 which is actuated by the movement of the diaphragm of the vacuum unit C is connected as at 25 with operating mechanism for the trip gallons unit G and the total gallons unit H. The counters of these units are of conventional type and are merely totalizers which may be utilized to count the gallons per trip or season. Their presence is, therefore, only an additional accessory which adds to the convenience of the instrument and does not in any way enter into the novelty or functioning of the present invention.

The operation of the specific construction described is, as follows:

If the vehicle has been running and stops there may be a part of the fuel increment left in the auxiliary tank T, and if the fuel was consumed at the rate of 8 miles per gallon, during the consumption of the previous unit of fuel the numeral "8" will remain visible on the dial. Assuming then that upon again starting that the indicator dial A reads "8", the shaft 13 will be driven by the road wheel, thereby rotating the pinion B′ and, as the latter is in mesh with the rack portion of the odometer element B, the latter will be rotated against the tension of the spring 12ª. When the vehicle again starts the dial A will still indicate the numeral "8". Suppose, however, that before the part or fractional of the increment of fuel remaining in the tank is consumed the motor obtains its maximum mileage per gallon which for example may be 12 miles per gallon. In that event the odometer element B through its stop 10 will engage the abutment 9 on the dial A and advance the dial A from reading "8" to reading "12".

If the vehicle is still running under the same conditions as those obtained when the dial was caused to register "12" and the vacuum tank sucks in a new full increment of fuel and the vehicle continues to run under the same conditions, the dial will still indicate "12" showing that the machine is still obtaining 12 miles per gallon.

However, suppose that the vehicle encounters a grade and consequently consumes more fuel than in the previous case. Under these circumstances the odometer wheel B, will not rotate so far as in the previous case, and as the dial A is released in advance of the disengagement of the driving pinion B′ from the odometer element B, the dial A will drop back in proportion, that is until the stop or abutment 9 on the dial A engages the stop or abutment 10 on the odometer.

A similar change in the indication will take place upon each actuation of the vacuum unit C in accordance with the changing conditions of running, and therefore the miles per gallon dial A will "float" between high and low miles per gallon limits throughout its operation.

Each time the vacuum unit C is actuated, it will be understood that a new unit of fuel is pumped into the tank T and when the diaphragm 19 of the unit C is moved against the tension of the spring S it causes the shifting of the plunger-stem 18. As the clutch throwing lever 14 is connected with the plunger-stem 18 it will therefore be rocked on its axis 15 upon each actuation of the diaphragm of the vacuum unit C. When the rear arm of the lever 14 is pulled backwardly by the stem 18, the rod 21 will move. As previously indicated the rod 21 engages with the yoke of the pawl 23 by means of shoulder 22, and therefore the pawl will be tripped and release dial A allowing dial A to turn backwards under action of spring 6 until depending stop 9 engages abutment 10 on odometer element B, a second tapered shoulder 21ᵇ on rod 21 now engages post 21ᶜ thus releasing shoulder 22 from pawl yoke 22ª and pawl 23 re-engages ring 7 on dial A. Pinion B′ is now disengaged from the odometer element B and the latter returns to the zero position. It will therefore be apparent that when the driving pinion B′ and pawl 23 disengage the odometer element B and dial A respectively, the pawl 23 is snapped back into engagement with the dial A before the driving pinion B′ is released from its engagement with the rack of the odometer element B and dial A is held while driving pinion B′ is returned into engagement with B, due to the destruction of the vacuum in the chamber 20 of the unit C. The time required to establish the vacuum in chamber 20 is sufficient to permit disengagement of the pawl 23 from the detent rack 7 of the dial A and a return to zero position if necessary while disengaged under action of the spring 6.

As the increments of fuel are comparatively small, for example 1/30 of a gallon, it will be apparent that 30 indications will be given for each gallon of fuel consumed. As stated, under continuous running conditions the miles per gallon wheel "floats" between high and low miles per gallon points and only shows the miles per gallon being obtained from a given fuel unit under the then existing conditions. On the basis of 30 readings per gallon of fuel consumed, as above indicated, and running at 20 miles per hour, and assuming that the motor is averaging 20 miles per gallon at that speed, a new reading will be registered by the dial A every two minutes or at every .6 miles.

It will of course be understood that the scale on the dial A is a special miles per gallon scale, although for convenience and manufacturing a standard speedometer part is utilized, the scale, as indicated, being specially calibrated to indicate the consumption of the unit of fuel per unit of distance.

The register G indicating gallons per trip may be calibrated in accordance with the unit of fuel, and as shown in Figure 3 for instance the same may be operated from the plunger-stem 18 by the arm G' of an operating wheel G² having the pin and slot engagement 25 with the stem. The decimal wheel of the trip gallons unit is actuated in a conventional way through the connection G'-G² and the other wheels of the trip registering unit are also picked up in turn. The total gallons unit is of course connected in a conventional way by the trip gallons unit to record the accumulated readings.

Without further description it is thought that the features and advantages of the invention will be readily apparent, and it will of course be understood that changes in the form, proportion, and minor details of construction may be resorted to without departing from the spirit of the invention or the scope of the appended claims.

I claim:

1. In a vacuum operated miles per gallon register, a casing, an odometer element, a dial mounted in said casing to operate in a horizontal plane and having thereon a miles per gallon scale, a slidable actuator for said odometer element, a check device for the dial, a diaphragm unit within the casing and including a plunger, and means operated by said plunger for shifting said slidable actuator and releasing said check device.

2. In a vacuum operated miles per gallon register, a casing, a diaphragm at the back of the casing, a plunger operated by the diaphragm, a vertical post arranged within the casing, a dial mounted on said post and operating in a horizontal plane, said dial having thereon a miles per gallon scale, a ring-like odometer element mounted beneath the dial and concentric therewith, said element having rack teeth, a pinion adapted to engage with said teeth, a lever for shifting said pinion and adapted to be engaged by said plunger, a check device for the dial, and means operated by said lever for releasing the check means.

3. In a vacuum operated miles per gallon register, an indicating dial, an odometer element operatively connecting with the dial, a check device engaging with the dial, a driving wheel for actuating the odometer element, a vacuum actuated unit including a shiftable plunger stem, an angular lever having one arm engaged by said plunger stem and the other arm engaging with the driving wheel for slidably moving the same into and out of engagement with the odometer element, and a connection between said angular lever and the check device for operating the same in advance of the driving wheel.

4. In a vacuum operated miles per gallon register, an indicating dial having thereon a miles per gallon scale, an odometer rack, a check pawl for temporarily arresting the movement of the dial, a driving pinion for actuating the said odometer rack, a diaphragm unit including a shiftable plunger stem, an angular lever having one arm thereon connected with the plunger stem and the other arm thereof formed into a clutch shifter-yoke for engaging with said driving pinion, a member connecting with the arm of the said angular lever and having a shoulder for engaging with the check pawl.

5. In a vacuum operated miles per gallon register, an indicating dial having thereon a miles per gallon scale, an odometer rack adapted to actuate said dial in one direction, a spring for operating the dial in the opposite direction, a check pawl for temporarily restraining the dial, a driving pinion for actuating the odometer rack, a diaphragm unit including a housing, a flexible diaphragm arranged in said housing, a plunger stem carried with the diaphragm, means carried by the housing for limiting the throw of the plunger stem, an angular lever having one arm connected with the plunger stem and the other arm engaging with the driving pinion, and a member connected with the said arm of the angular lever which engages with the driving pinion for engaging the check pawl.

In testimony whereof I hereunto affix my signature in the presence of two witnesses.

CLINTON WALLACE HOUGH.

Witnesses:
EMORY L. GROFF,
G. M. NELSON.